US010452930B2

(12) United States Patent
Sato

(10) Patent No.: US 10,452,930 B2
(45) Date of Patent: Oct. 22, 2019

(54) INFORMATION DISPLAY DEVICE MOUNTED IN VEHICLE INCLUDING DETECTOR

(71) Applicant: TOYOTA JIDOSHA KABUSHIKI KAISHA, Toyota-shi, Aichi-ken (JP)

(72) Inventor: Jun Sato, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 203 days.

(21) Appl. No.: 15/337,593

(22) Filed: Oct. 28, 2016

(65) Prior Publication Data

US 2017/0132481 A1     May 11, 2017

(30) Foreign Application Priority Data

Nov. 6, 2015 (JP) ................................. 2015-218628

(51) Int. Cl.
*G06K 9/00* (2006.01)
*B60K 35/00* (2006.01)
(Continued)

(52) U.S. Cl.
CPC .......... *G06K 9/00805* (2013.01); *B60K 35/00* (2013.01); *B60R 1/00* (2013.01);
(Continued)

(58) Field of Classification Search
None
See application file for complete search history.

(56) References Cited

U.S. PATENT DOCUMENTS

| 5,173,881 A * | 12/1992 | Sindle | B60Q 9/006 367/101 |
| 2007/0032914 A1 * | 2/2007 | Kondoh | B60W 50/16 701/1 |

(Continued)

FOREIGN PATENT DOCUMENTS

| JP | 2007-158578 A | 6/2007 |
| JP | 2009-051346 A | 3/2009 |

(Continued)

OTHER PUBLICATIONS

Jayaraman, Swapnaa. "Supporting Monitoring and Interruption Management in Complex Domains through Graded Multimodal Notifications." (2011). (Year: 2011).*

*Primary Examiner* — Clifford Hilaire
(74) *Attorney, Agent, or Firm* — Sughrue Mion, PLLC

(57) ABSTRACT

An information display device mounted in a vehicle, the vehicle including a detector detecting an object around the vehicle, the information display device includes a display configured to display a vehicle object corresponding to the vehicle, and a display region disposed on a side of the vehicle in a first direction, the first direction extending from the vehicle object, the first direction corresponding to a second direction extending from the vehicle, the display region having a constant size and a constant shape and at least one electronic control unit configured to calculate a risk degree indicating information of the risk of an object around the vehicle and the vehicle approaching each other in the second direction based on a detection result of the detector, and change an appearance of the display region based on a magnitude of the risk degree.

10 Claims, 11 Drawing Sheets

(51) Int. Cl.
    *B60R 1/00*           (2006.01)
    *G06K 9/46*           (2006.01)
    *G06K 9/52*           (2006.01)
    *G01C 21/36*          (2006.01)
    *G08G 1/16*           (2006.01)
    *G06T 11/60*          (2006.01)

(52) U.S. Cl.
    CPC ..... *G01C 21/3602* (2013.01); *G01C 21/3658* (2013.01); *G06K 9/00335* (2013.01); *G06K 9/4652* (2013.01); *G06K 9/4671* (2013.01); *G06K 9/52* (2013.01); *G06T 11/60* (2013.01); *G08G 1/165* (2013.01); *G08G 1/166* (2013.01); *G08G 1/167* (2013.01); *B60K 2370/1529* (2019.05); *B60K 2370/166* (2019.05); *B60K 2370/172* (2019.05); *B60K 2370/178* (2019.05); *B60K 2370/179* (2019.05); *B60K 2370/188* (2019.05); *B60K 2370/785* (2019.05); *B60R 2300/205* (2013.01); *B60R 2300/301* (2013.01); *B60R 2300/304* (2013.01); *B60R 2300/607* (2013.01); *B60R 2300/8093* (2013.01); *G06K 2009/4666* (2013.01)

(56) References Cited

U.S. PATENT DOCUMENTS

| 2009/0284360 | A1* | 11/2009 | Litkouhi | B60Q 9/00 340/439 |
| 2013/0090843 | A1 | 4/2013 | Funabashi | |
| 2013/0147958 | A1 | 6/2013 | Mitsuta et al. | |
| 2015/0314783 | A1* | 11/2015 | Nespolo | B60W 30/0953 701/301 |
| 2015/0348417 | A1* | 12/2015 | Ignaczak | G08G 1/165 340/435 |

FOREIGN PATENT DOCUMENTS

| JP | 2013-080422 A | 5/2013 |
| JP | 2015-081057 A | 4/2015 |
| JP | 2015-106326 A | 6/2015 |
| WO | 2012/169352 A1 | 12/2012 |

* cited by examiner

FIG. 10A
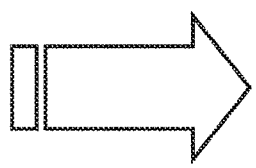
FIG. 10B
R
FIG. 10C

INFORMATION DISPLAY DEVICE MOUNTED IN VEHICLE INCLUDING DETECTOR

INCORPORATION BY REFERENCE

The disclosure of Japanese Patent Application No. 2015-218628 filed on Nov. 6, 2015 including the specification, drawings and abstract is incorporated herein by reference in its entirety.

BACKGROUND OF THE DISCLOSURE

1. Field of the Disclosure

The present disclosure relates to an information display device mounted in a vehicle including a detector.

2. Description of Related Art

Japanese Patent Application Publication No. 2015-106326 (JP 2015-106326 A) described an information display device. This device displays a risk image representing the risk of an obstacle approaching a vehicle on a display. Specifically, this device displays a risk image according to the risk outside a vehicle object corresponding to a vehicle in plan view. The risk image is displayed so as to project in an outward direction from the vehicle object. The risk image expresses risk with the size of an image. For this reason, the larger the risk image, the higher the risk.

SUMMARY OF THE DISCLOSURE

On the other hand, since the size of the display region of the on-vehicle display is limited, efficient information presentation with the display region within a limited range is preferable. However, in the device described in JP 2015-106326 A, since the risk image is displayed so as to project in the outward direction from the vehicle object, it is necessary to secure a display region for the risk image according to a case where risk is the greatest. In addition, since the device described in JP 2015-106326 A expresses risk with the size of the risk image, it is necessary to secure a display region for the risk image to such an extent that the size can be distinctive.

According to the disclosure, it is possible to effectively utilize the display region of the on-vehicle display.

A first aspect of the disclosure provides an information display device mounted in a vehicle. The vehicle includes a detector detecting an object around the vehicle. The information display device according to the first aspect includes a display configured to display a vehicle object corresponding to the vehicle, and a display region disposed on a side of the vehicle in a first direction, the first direction extending from the vehicle object, the first direction corresponding to a second direction extending from the vehicle, the display region having a constant size and a constant shape. And the information display device includes at least one electronic control unit configured to calculate a risk degree indicating information of the risk of an object around the vehicle and the vehicle approaching each other in the second direction based on a detection result of the detector, and to change an appearance of the display region based on a magnitude of the risk degree.

In the first aspect of the disclosure, the display may be configured to display a plurality of display regions each of which is disposed on a side of the vehicle object in a corresponding one of directions extending from the vehicle object. And the at least one electronic control unit may be configured to determine traveling direction information indicating a traveling direction in which the vehicle is about to travel. And the at least one electronic control unit may be configured to display a direction object representing the traveling direction information on the display so as to overlap a display region disposed on a side of the vehicle object in a direction corresponding to the traveling direction.

In the first aspect of the disclosure, the at least one electronic control unit may be configured to determine a display color for each display region based on the magnitude of the risk degree. And the at least one electronic control unit may be configured to display the display color in the each display region.

In the first aspect of the disclosure, the display may be configured to display a front display region of the vehicle object corresponding to a region in front of the vehicle, a rear display region of the vehicle object corresponding to a region behind the vehicle, a left display region of the vehicle object corresponding to a region left to the vehicle, and a right display region of the vehicle object corresponding to a region right to the vehicle.

In the first aspect of the disclosure, each of the left display region and the right display region may be larger than the front display region.

In the first aspect of the disclosure, the display may be configured to display a circular circle object which surrounds the vehicle object and is disposed so as to overlap the display region.

In the first aspect of the disclosure, the display may be configured to display a radiation object which extends outward from the vehicle object and divides the circle object.

In the first aspect of the disclosure, the radiation object may have one end disposed outside the circle object and the other end disposed inside the circle object.

In the first aspect of the disclosure, graduations may be marked on the circle object at regular intervals.

In the first aspect of the disclosure, the display color may be a same color in a same display region.

In the first aspect of the disclosure, the display color may be determined such that a case where the risk degree is the smallest is associated with blue and a case where the risk degree is the greatest is associated with red.

In the first aspect of the disclosure, the traveling direction information may be information indicating a lane change direction or a right or left turn direction of the vehicle.

In the first aspect of the disclosure, the at least one electronic control unit may be configured to output a signal for controlling traveling of the vehicle based on the traveling direction information and to control the traveling of the vehicle by sending the signal to an actuator of the vehicle.

In the first aspect of the disclosure, the display may be a head-up display or a liquid crystal display.

In the first aspect of the disclosure, the detector may be a lidar, a radar, or a camera sensor.

A second aspect of the disclosure provides an information display device which displays an image on an on-vehicle display mounted in a vehicle, the vehicle including a detector detecting an object around the vehicle. The information display device according to the second aspect includes the on-vehicle display configured to display a vehicle object corresponding to the vehicle in plan view, a front display region of the vehicle object corresponding to a region in front of the vehicle, a rear display region of the vehicle object corresponding to a region behind the vehicle, a left display region of the vehicle object corresponding to a region left to the vehicle, a right display region of the vehicle object corresponding to a region right to the vehicle, and a circular circle object surrounding the vehicle object and being disposed to cross the front display region, the rear display region, the left display region, and the right display region. And the information display device includes at least one electronic control unit configured to display the vehicle object, the front display region, the rear display region, the left display region, the right display region, and the circle object on the on-vehicle display, to calculate a risk degree indicating the risk of an object around the vehicle and the vehicle approaching each other based on a detection result of the detector for each of the front display region, the rear display region, the left display region, and the right display region, to determine display colors of the front display region, the rear display region, the left display region, and the right display region based on the risk degree, and to display the front display region, the rear display region, the left display region, and the right display region in the display colors regarding at least the inside of the circle object.

With this, in the information display device, the display colors of the front display region, the rear display region, the left display region, and the right display region are determined based on the risk degree by the display color determination unit. At least the inside of the circle object among the front display region, the rear display region, the left display region, and the right display region is displayed in the determined display colors by the display control unit. In this way, risk is expressed in a color, whereby it is not necessary to secure the display region according to a case where risk is the greatest, and in addition, it is not necessary to secure the display region to such an extent that the size can be distinctive. Accordingly, this device can effectively utilize the display region of the on-vehicle display.

In the second aspect of the disclosure, the at least one electronic control unit may be configured to acquire traveling direction information indicating a lane change direction or a right or left turn direction of the vehicle during automatic driving control from an automatic driving system performing automatic driving control on the vehicle and to display a direction object representing the lane change direction or the right or left turn direction of the vehicle in a display region corresponding to the lane change direction or the right or left turn direction of the vehicle out of the left display region and the right display region based on the acquired traveling direction information.

With this, since this device can give notification of both of risk and the traveling direction of the vehicle using the same display region, it is possible to effectively utilize the display region of the on-vehicle display.

In the second aspect of the disclosure, each of the left display region and the right display region may be larger than the front display region.

With this, this device can give notification of risk on the region right to the vehicle and the region left to the vehicle, which is hard for a driver to recognize visually in contrast to the region in front of the vehicle, with priority over risk in front of the vehicle.

According to the aspects of the disclosure, it is possible to effectively utilize the display region of the on-vehicle display.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10A is a diagram illustrating a modification example of a direction object shown in FIG. 8.

FIG. 10B is a diagram illustrating a modification example of a direction object shown in FIG. 8.

FIG. 10C is a diagram illustrating a modification example of a direction object shown in FIG. 8.

DETAILED DESCRIPTION OF EMBODIMENTS

Figure 1:
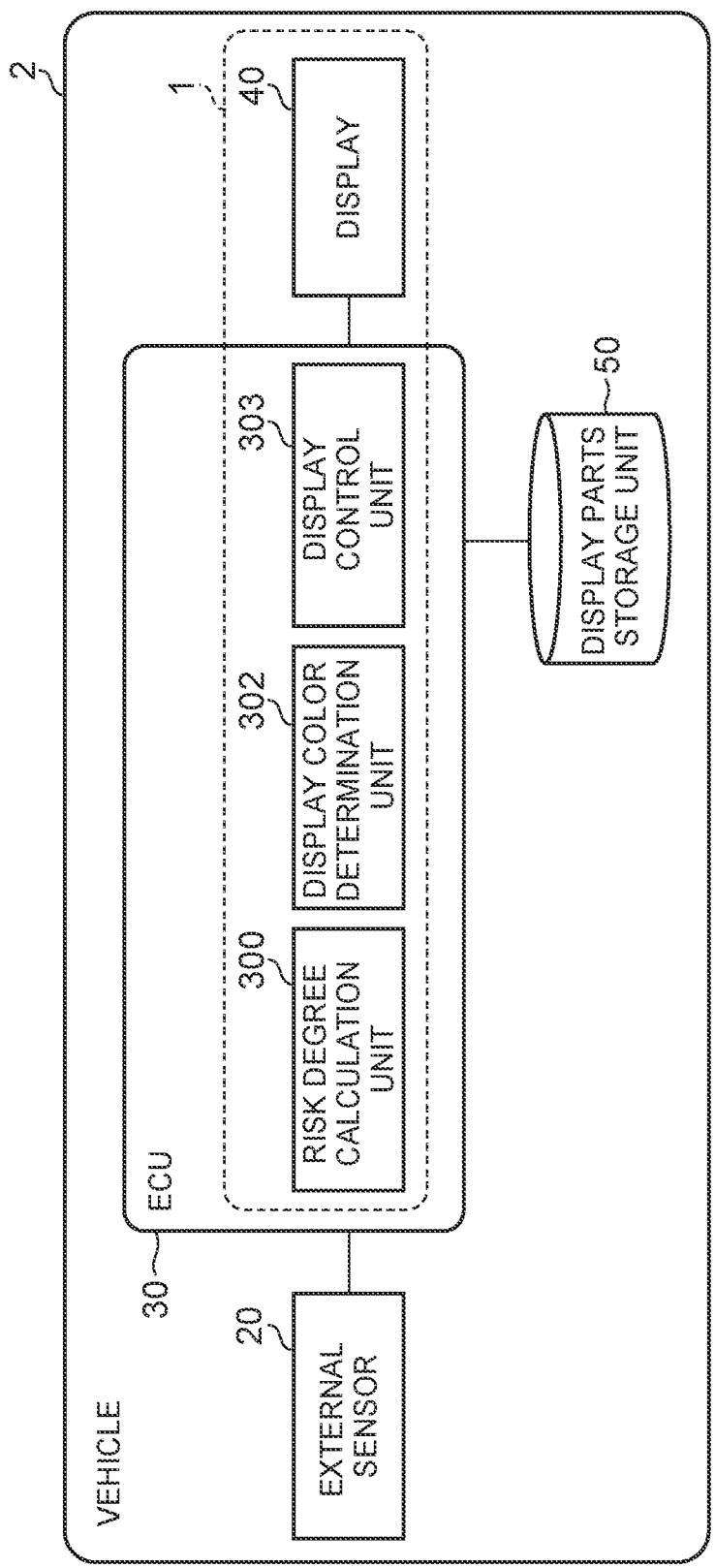
FIG. 1 is a block diagram illustrating the configuration of a vehicle including an information display device according to a first embodiment.

Hereinafter, an embodiment of the disclosure will be described referring to the drawings. In the following description, the same or corresponding elements are represented by the same reference numerals, and overlapping description will be omitted.

First Embodiment

FIG. 1 is a block diagram illustrating the configuration of a vehicle including an information display device according to a first embodiment. As shown in FIG. 1, an information display device 1 is mounted in a vehicle 2, such as a passenger vehicle. The information display device 1 displays an image on a display (on-vehicle display) 40 described below, thereby giving notification of an object around the vehicle 2 approaching the vehicle 2 to an occupant. Hereinafter, a case where an occupant is a driver will be described as an example.

The vehicle 2 includes an external sensor 20, an electronic control unit (ECU) 30, a display 40, and a display parts storage unit 50. The external sensor 20, the ECU 30, the display 40, and the display parts storage unit 50 are respectively connected to a network which performs communication using a controller area network (CAN) communication circuit, and can perform intercommunication.

First, the external sensor 20 will be described. The external sensor 20 is a detector which detects an object around the vehicle 2. An object is a tangible object, and is a preceding vehicle, a pedestrian, a stationary object, such as a guardrail, or the like. As an example of the external sensor 20, a laser imaging detection and ranging (LIDAR) is used. A lidar detects an object around the vehicle 2 using laser light. As a specific example, a lidar transmits laser light within a radiation range around the vehicle 2. In a case where there is an object which reflects laser light within the radiation range, the lidar acquires reflected light. The lidar detects the relative distance between the vehicle 2 and the object based on the time until radiated laser light returns as reflected light. The lidar detects the relative speed between the vehicle 2 and the object based on change in frequency of reflected light. The lidar detects the direction of the object based on an angle of reflected light. The lidar transmits detection results to the ECU 30. The detection results are information obtained by detection operations of the lidar, and include at least the relative distance, the relative speed, and the direction described above.

Figure 2:
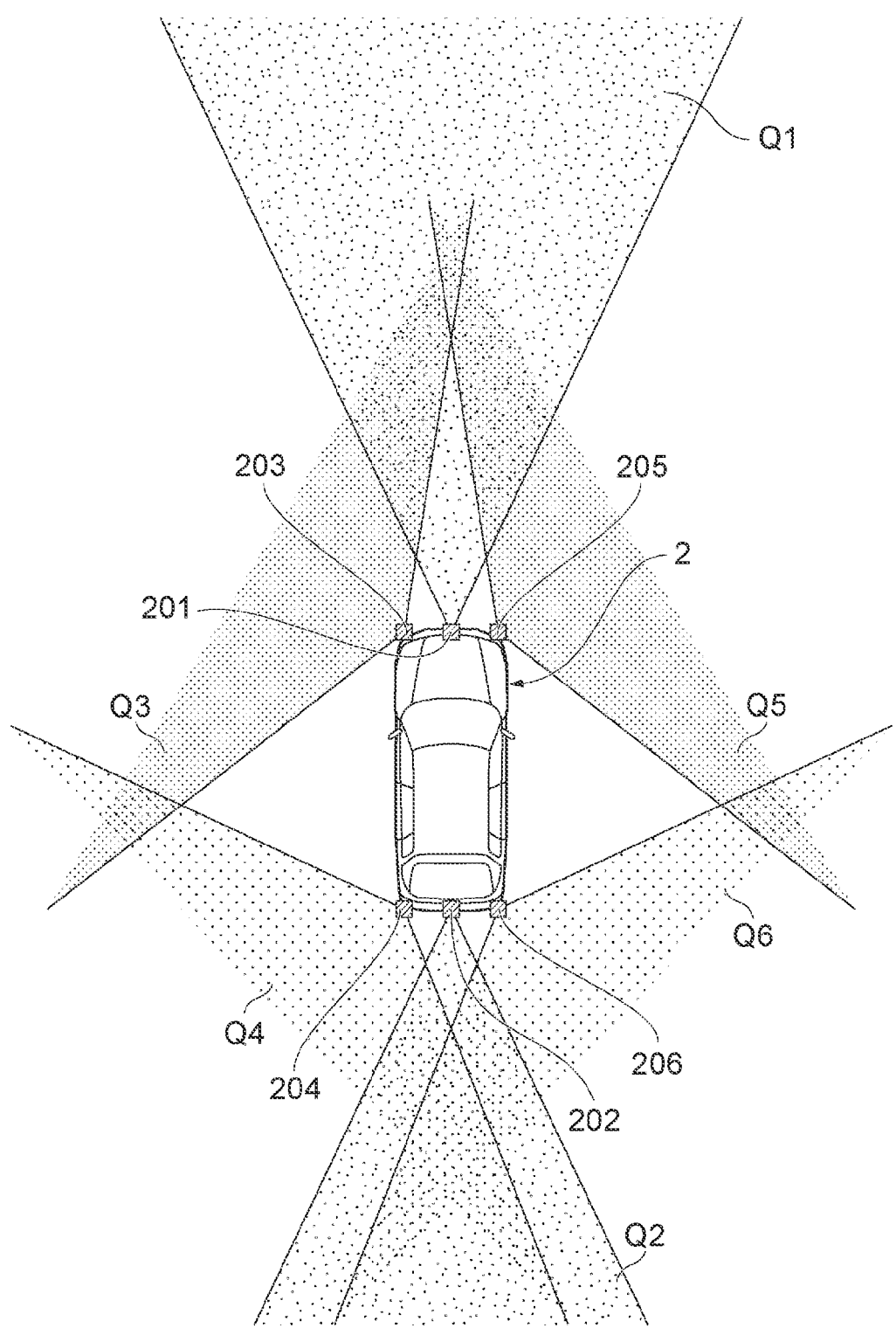
FIG. 2 shows an example of positions of sensors of a vehicle.

Next, the attachment position of the lidar will be described. FIG. 2 shows an example of positions of sensors of the vehicle 2. As shown in FIG. 2, a plurality of lidars are attached to the vehicle 2 as the external sensor 20. The vehicle 2 includes a front lidar 201, a rear lidar 202, a left front lidar 203, a left rear lidar 204, a right front lidar 205, and a right rear lidar 206. The front lidar 201 is provided at the center of a front end portion of the vehicle 2 in a vehicle width direction, and radiates millimeter waves within a radiation range Q1 in front of the vehicle 2. The rear lidar 202 is provided at the center of a rear end portion of the vehicle 2 in the vehicle width direction, and radiates millimeter waves within a radiation range Q2 behind the vehicle 2. The left front lidar 203 is provided at the left end of the front end portion of the vehicle 2, and radiates millimeter waves within a radiation range Q3 in left front of the vehicle 2. The left rear lidar 204 is provided at the left end of the rear end portion of the vehicle 2, and radiates millimeter waves within a radiation range Q4 left behind the vehicle 2. The right front lidar 205 is provided at the right end of the front end portion of the vehicle 2, and radiates millimeter waves within a radiation range Q5 in right front of the vehicle 2. The right rear lidar 206 is provided at the right end of the rear end portion of the vehicle 2, and radiates millimeter waves within a radiation range Q6 right behind the vehicle 2.

In this way, the front lidar 201 performs monitoring a region in front of the vehicle 2. The rear lidar 202 performs monitoring a region behind the vehicle 2. The left front lidar 203 performs monitoring a region in left front of the vehicle 2. The left rear lidar 204 performs monitoring a region left behind the vehicle 2. The right front lidar 205 performs monitoring a region in right front of the vehicle 2. The right rear lidar 206 performs monitoring a region right behind the vehicle 2. The left front lidar 203 and the left rear lidar 204 perform monitoring a region on the left of the vehicle 2. The right front lidar 205 and the right rear lidar 206 perform monitoring a region on the right of the vehicle 2. Accordingly, the external sensor 20 performs monitoring in eight directions around the vehicle 2.

Next, the configuration of the ECU 30 will be described. The ECU 30 is an electronic control unit having a central processing unit (CPU), a read only memory (ROM), a random access memory (RAM), a controller area network (CAN) communication circuit, and the like. The ECU 30 controls hardware based on a signal output from the CPU and realizes the functions of the constituent elements of the ECU 30 described below. As an example of a specific operation, the ECU 30 inputs and outputs data by operating the CAN communication circuit, stores input data in the RAM, loads a program stored in the ROM on the RAM, and executes the program loaded on the RAM. The ECU 30 controls the display 40.

Next, the display 40 will be described. The display 40 is a display which is mounted in the vehicle and displays an image in a display region. An image is an image which is displayed in the display region. The display 40 is controlled by the ECU 30 and displays an image in the display region. As the display 40, a display capable of displaying a color is used. As an example of the display 40, a head-up display is used. A head-up display is a display which superimposes information on the visual field of the driver of the vehicle 2. The head-up display has a projection unit which is provided in an instrument panel of the vehicle 2. The projection unit projects an image on a reflective surface inside a front windshield through an opening provided in the instrument panel. The driver can visually recognize an image based on reflection of the reflective surface. A display region of the head-up display is a region set in advance in the front windshield, and is a range in which an image is projected.

Figure 3:
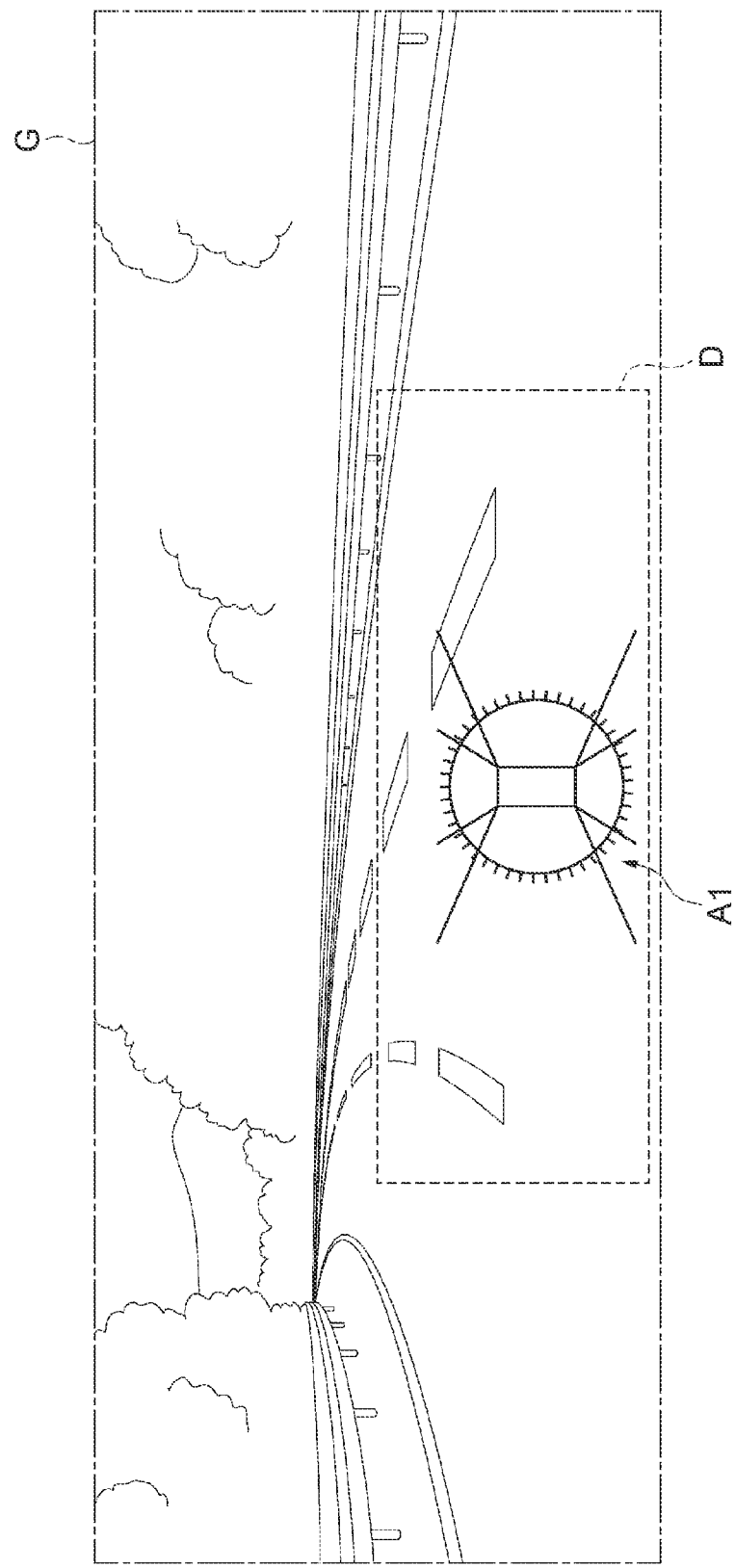
FIG. 3 shows an example of objects displayed on the information display device shown in FIG. 1.

FIG. 3 shows an example of objects displayed on the information display device 1 shown in FIG. 1. In FIG. 3, a part of a front windshield G is shown. In the front windshield G, a display region D of the head-up display is set. In the display region D, a circumstances notification object A1 is displayed. The circumstances notification object A1 is an object for giving notification of circumstances around the vehicle 2. An object is an object which is displayed as an image. As a specific example, an object is a character, a symbol, a line, a figure, or a combination thereof. The circumstances around the vehicle 2 include the risk of an object around the vehicle 2 and the vehicle 2 are approaching each other. An object around the vehicle 2 is another vehicle, a pedestrian, or the like. The driver can visually recognize the circumstances notification object A1 displayed in the display region D of the front windshield G along with an actual scene.

Figure 4:
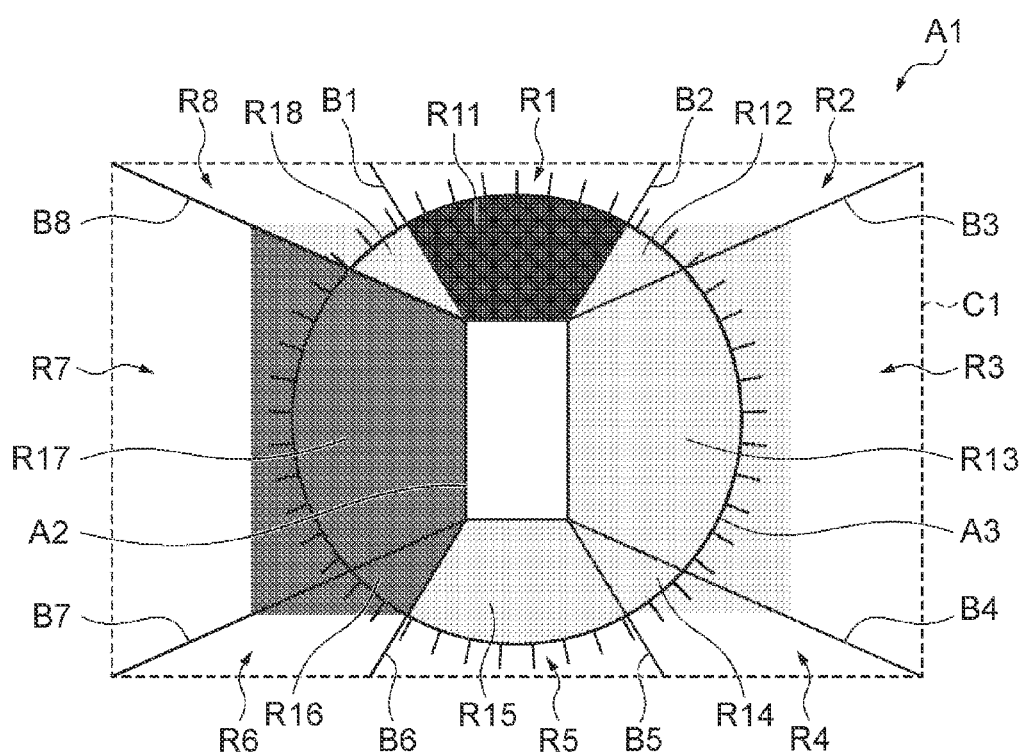
FIG. 4 is a diagram illustrating the objects shown in FIG. 3.

FIG. 4 is a diagram illustrating the objects shown in FIG. 3. As shown in FIG. 4, the circumstances notification object A1 includes a vehicle object A2, a circle object A3, and radiation objects B1 to B8. The vehicle object A2 is an image corresponding to the vehicle 2 in plan view. In FIG. 4, the vehicle object A2 has a rectangular shape. The vehicle object A2 has a rectangular shape which is longer in an up-down direction than a right-left direction. An up-down direction of a screen corresponds to a front-rear direction of the vehicle 2, and a right-left direction of the screen corresponds to a right-left direction of the vehicle 2. The circle object A3 has a circular shape and is disposed so as to surround the vehicle object A2. The circle object A3 is disposed such that the center of the vehicle object A2 is positioned at the center inside the circle object A3. Graduations are marked on the circle object A3 at regular intervals. The driver easily visually recognizes the positions of the radiation objects B1 to B8 with the graduations. Thus the graduations generate a visual effect that the width of each of the eight display regions surrounding the vehicle object A2 described below is easily understood.

The radiation objects B1 to B8 extend outward from the vehicle object A2. In FIG. 4, the two radiation objects B1 and B8 extend from a portion of the vehicle object A2 corresponding to the left end portion on the front side of the vehicle 2. The two radiation objects B2 and B3 extend from a portion of the vehicle object A2 corresponding to the right end portion on the front side of the vehicle 2. The two radiation objects B4 and B5 extend from a portion of the vehicle object A2 corresponding to the right end portion on the rear side of the vehicle 2. The two radiation objects B6 and B7 extend from a portion of the vehicle object A2 corresponding to the left end portion on the rear side of the vehicle 2. The radiation objects B1 to B8 extend outside the circle object A3.

The radiation objects B1, B2, B5, and B6 extending in the up-down direction of the vehicle object A2 have the same length. The radiation objects B3, B4, B7, and B8 extending in the right-left direction of the vehicle object A2 have the same length. The radiation objects B1 to B8 are disposed symmetrically. The end portion of each of the radiation objects B1 to B8 is disposed on a virtual quadrangle C1. With this, objects with excellent design characteristics are obtained.

The radiation objects B1 to B8 divide the virtual quadrangle C1 into eight divisions. Above the vehicle object A2, a front display region R1 surrounded by the radiation objects B1 and B2 and the virtual quadrangle C1 is formed. The front display region R1 is a display region corresponding to the region in front of the vehicle 2. Below the vehicle object A2, a rear display region R5 surrounded by the radiation objects B5 and B6 and the virtual quadrangle C1 is formed. The rear display region R5 is a display region corresponding to the region behind the vehicle 2. On the left of the vehicle object A2, a left display region R7 surrounded by the radiation objects B7 and B8 and the virtual quadrangle C1 is formed. The left display region R7 is a display region corresponding to the region left to the vehicle 2. On the right of the vehicle object A2, a right display region R3 surrounded by the radiation objects B3 and B4 and the virtual quadrangle C1 is formed. The right display region R3 is a display region corresponding to the region right to the vehicle 2. Each of the left display region R7 and the right display region R3 is larger than the front display region R1.

On the upper left of the vehicle object A2, an upper left display region R8 surrounded by the radiation objects B1 and B8 and the virtual quadrangle C1 is formed. The upper left display region R8 is a display region corresponding to in left front of the vehicle 2. On the upper right of the vehicle object A2, an upper right display region R2 surrounded by the radiation objects B2 and B3 and the virtual quadrangle C1 is formed. The upper right display region R2 is a display region corresponding to in right front of the vehicle 2. On the lower left of the vehicle object A2, a lower left display region R6 surrounded by the radiation objects B6 and B7 and the virtual quadrangle C1 is formed. The lower left display region R6 is a display region corresponding to left behind the vehicle 2. On the lower right of the vehicle object A2, a lower right display region R4 surrounded by the radiation objects B4 and B5 and the virtual quadrangle C1 is formed. The lower right display region R4 is a display region corresponding to right behind the vehicle 2.

In this way, the eight display regions surrounding the surroundings of the vehicle object A2 are formed by dividing the virtual quadrangle C1 with a plurality of radiation objects. For this reason, the outer edge of each of the front display region R1, the rear display region R5, the left display region R7, the right display region R3, the upper left display region R8, the upper right display region R2, the lower left display region R6, and the lower right display region R4 coincides with the outer edge of the virtual quadrangle C1. That is, the eight display regions surrounding the surroundings of the vehicle object A2 are unchangeable regions having a fixed size. Since a plurality of radiation objects extend outside the circle object A3, the circle object A3 crosses the eight display regions surrounding the surroundings of the vehicle object A2 while surrounding the vehicle object A2.

Each of the eight display regions surrounding the surroundings of the vehicle object A2 is displayed in a predetermined display color under the control of the ECU 30. Specifically, at least the inside of the circle object A3 among the eight display regions surrounding the surroundings of the vehicle object A2 is displayed in predetermined display colors. Hereinafter, the functions of the ECU 30 will be described. As shown in FIG. 1, the ECU 30 includes a risk degree calculation unit 301, a display color determination unit 302, and a display control unit 303.

First, the risk degree calculation unit 301 will be described. The risk degree calculation unit 301 calculates a risk degree indicating the risk of an object around the vehicle 2 approaching the vehicle 2. The risk degree is an index representing the risk of an object around the vehicle 2 approaching the vehicle 2. As a specific example, as the greater the risk degree is, the greater the risk of an object around the vehicle 2 approaching the vehicle 2 is.

The input of the risk degree calculation unit 301 will be described. The risk degree calculation unit 301 acquires the detection results of the external sensor 20. The risk degree calculation unit 301 acquires the detection results from the front lidar 201, the rear lidar 202, the left front lidar 203, the left rear lidar 204, the right front lidar 205, and the right rear lidar 206.

The calculation and the output of the risk degree calculation unit 301 will be described. The risk degree calculation unit 301 calculates the risk degree based on the detection results of the external sensor 20 for each of the front display region R1, the rear display region R5, the left display region R7, the right display region R3, the upper left display region R8, the upper right display region R2, the lower left display region R6, and the lower right display region R4. The risk degree calculation unit 301 first performs processing for each object. The risk degree calculation unit 301 calculates the remaining time until the vehicle 2 comes into contact with the object by dividing the relative distance from the object by the relative speed. The risk degree calculation unit 301 calculates the risk degree to be greater when the remaining time is smaller. As a specific example, the risk degree calculation unit 301 sets a reciprocal of the remaining time as the risk degree.

The risk degree calculation unit 301 acquires an approaching direction, in which the object is approaching, based on the detection results of the external sensor 20. As a specific example, the risk degree calculation unit 301 determines that the risk degree of an object whose approaching direction is the front is the risk degree related to the region in front of the vehicle 2. That is, the risk degree calculation unit 301 calculates the risk degree and correlates the risk degree with the surrounding direction of the vehicle 2 based on the direction in which the object is approaching. The risk degree calculation unit 301 correlates the risk degree with the display region using the surrounding direction correlated with the risk degree. In a case where the correlated surrounding direction is the front, the risk degree calculation unit 301 correlates the calculated risk degree with the front display region R1. In a case where the correlated surrounding direction is the rear, the risk degree calculation unit 301 correlates the calculated risk degree with the rear display region R5. In a case where the correlated surrounding direction is the left front, the left, the left rear, the right front, the right, and the right rear, similarly to a case where the surrounding direction is the front and the rear, the risk degree is correlated with the display region.

In a case where the approaching directions of a plurality of objects are the same, the risk degree calculation unit 301 adds the risk degree of each of a plurality of objects and associates the risk degree with the surrounding direction of the vehicle. As a specific example, in a case where an object O1 and an object O2 are approaching from the front toward the vehicle 2, the total risk degree obtained by adding the risk degree of the object O1 and the risk degree of the object O2 is determined as the risk degree related to the region in front of the vehicle 2. In this case, the risk degree calculation unit 301 correlates the total risk degree with the front display region R1.

In a case where the risk degree is correlated with the display region using the above-described method, a risk degree in a direction in which an object is not approaching is not calculated. Accordingly, the risk degree calculation unit 301 correlates a display region corresponding to the direction, in which an object is not approaching, with a risk degree indicating that there is no risk. As a specific example, the risk degree calculation unit 301 correlates a display region corresponding to a direction, in which an object is not approaching, with a risk degree having the smallest value. In this way, the risk degree calculation unit 301 correlates all display regions with the risk degrees. The risk degree calculation unit 301 outputs the results of the correlation.

Next, the display color determination unit 302 will be described. The display color determination unit 302 determines a display color for each display region based on the results of the correlation of the risk degree calculation unit 301. The display color is a color which is displayed by the display 40. The display color determination unit 302 determines the display color for each display region based on the risk degree correlated with each display region. As a specific example, a color table in which a numerical value of the risk degree is associated with a display color is stored in a storage unit of the ECU 30. In the color table, a range in which the value of the risk degree is a first risk degree U to a second risk degree X is associated with blue, and a range in which the value of the risk degree is the second risk degree X to a third risk degree Y is associated with yellow, and a range in which the value of the risk degree is the third risk degree Y to a fourth risk degree Z is associated with red. In this example, the value of the risk degree within the range of the first risk degree U to the second risk degree X may be smaller than the value of the risk degree within the range of the third risk degree Y to the fourth risk degree Z. The display color determination unit 302 determines the display color for each display region based on the magnitude of the risk degree with reference to the color table. The display color determination unit 302 outputs information indicating the display color of each display region.

Next, the display control unit 303 will be described. The display control unit 303 displays the vehicle object A2, the front display region R1, the rear display region R5, the left display region R7, the right display region R3, the upper left display region R8, the upper right display region R2, the lower left display region R6, and the lower right display region R4 on the head-up display as the display 40.

The display control unit 303 acquires parts of an image with reference to the display parts storage unit 50. The display parts storage unit 50 is a storage unit in which parts of an image displayed in the display region of the display 40 are stored. Examples of parts include the objects constituting the circumstances notification object A1 shown in FIG. 3. As the objects constituting the circumstances notification object A1, the vehicle object A2 corresponding to the vehicle 2 in plan view and the radiation objects B1 to B8 dividing the range around the vehicle 2.

The display control unit 303 displays the front display region R1, the rear display region R5, the left display region R7, the right display region R3, the upper left display region R8, the upper right display region R2, the lower left display region R6, and the lower right display region R4 in the display colors determined by the display color determination unit 302. With this, the display colors according to risk are allocated to the eight display regions R1 to R8 surrounding the surroundings of the vehicle object A2. The display control unit 303 displays at least the inside of the circle object A3 among the eight display regions R1 to R8 surrounding the surroundings of the vehicle object A2 in the determined display colors. Specifically, the display control unit 303 displays a region R11 of the front display region R1 inside the circle object A3, a region R15 of the rear display region R5 inside the circle object A3, a region R17 of the left display region R7 inside the circle object A3, a region R13 of the right display region R3 inside the circle object A3, a region R18 of the upper left display region R8 inside the circle object A3, a region R12 of the upper right display region R2 inside the circle object A3, a region R16 of the upper left display region R6 inside the circle object A3, and a region R14 of the lower right display region R4 inside the circle object A3 in the determined display colors. The display control unit 303 displays the regions outside the circle object A3 among the display regions R1 to R8 in a gradation state where transparency gradually increases outward.

The information display device 1 is constituted of the risk degree calculation unit 301, the display color determination unit 302, the display control unit 303, and the display 40 described above.

Figure 5:
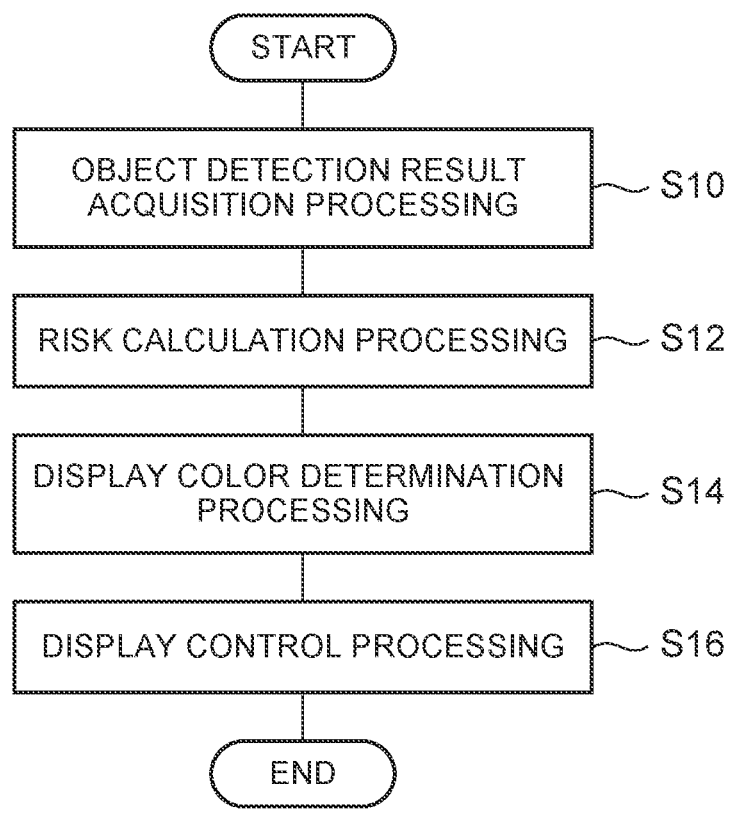
FIG. 5 is a flowchart of display control processing of the information display device shown in FIG. 1.

Next, the operation of the information display device 1 will be described. FIG. 5 is a flowchart of display control processing of the information display device 1. The display control processing shown in FIG. 5 is started by the ECU 30 at an ignition ON timing.

As shown in FIG. 5, the risk degree calculation unit 301 of the information display device 1 acquires the detection results of the external sensor 20 as object detection result acquisition processing (S10). As a specific example, the risk degree calculation unit 301 acquires the relative distance and the relative speed between the object and the vehicle 2 and the direction of the object.

Next, the risk degree calculation unit 301 of the information display device 1 calculates the risk degree for each display region as risk calculation processing (S12). The risk degree calculation unit 301 calculates the risk degree of each of the front display region R1, the rear display region R5, the left display region R7, the right display region R3, the upper left display region R8, the upper right display region R2, the lower left display region R6, and the lower right display region R4 based on the detection results of the external sensor 20 acquired in the object detection result acquisition processing (S10).

Next, the display color determination unit 302 of the information display device 1 determines the display color for each display region as display color processing (S14). The display color determination unit 302 determines the display color of each of the front display region R1, the rear display region R5, the left display region R7, the right display region R3, the upper left display region R8, the upper right display region R2, the lower left display region R6, and the lower right display region R4 based on the risk degree of each display region calculated in the risk calculation processing (S12) as the display color processing (S14). As a specific example, the display color determination unit 302 determines the display color with reference to the color tale stored in the storage unit of the ECU 30.

Next, the display control unit 303 of the information display device 1 displays at least the inside of the circle object A3 among the front display region R1, the rear display region R5, the left display region R7, the right display region R3, the upper left display region R8, the upper right display region R2, the lower left display region R6, and the lower right display region R4 in the display color determined in the display color processing (S14) as display control processing (S16).

In a case where the display control processing (S16) ends, the control processing shown in FIG. 5 ends. The information display device 1 restarts the processing from the start in a case of ignition ON. The information display device 1 does not restart the processing from the start in a case of ignition OFF.

As described above, according to the information display device 1 of the first embodiment, the display color determination unit 302 determines the display colors of the front display region R1, the rear display region R5, the left display region R7, and the right display region R3 based on the risk degrees. The display control unit 303 displays at least the inside of the circle object A3 among the front display region R1, the rear display region R5, the left display region R7, and the right display region R3 in the determined display colors. In this way, risk is expressed with the color, whereby it is not necessary to secure a display region according to a case where risk is the greatest and it is not necessary to secure a display region to such an extent that the size can be distinctive. That is, the information display device 1 can reduce a display region required for giving notification of risk compared to a case where risk is expressed with the size of the object. Accordingly, the information display device 1 can effectively utilize the display region D of the display 40.

According to the information display device 1 of the first embodiment, each of the left display region R7 and the right display region R3 is larger than the front display region R1. That is, the display area of each of the left display region R7 and the right display region R3 is larger than that of the front display region R1. With this, the information display device 1 can give notification of risk on the region right to the vehicle and the region left to the vehicle, which is hard for the driver to recognize visually in contrast to the region in front of the vehicle, with priority over risk in front of the vehicle.

Second Embodiment

An information display device 1A according to a second embodiment is different from the information display device 1 according to the first embodiment in that a direction object A5 (see FIGS. 8 and 9) representing a lane change direction or a right/left turn direction of a vehicle 2A and a text object A6 (see FIGS. 8 and 9) indicating a behavior plan of the vehicle 2A are displayed. Hereinafter, the same constituent elements as those in the first embodiment are represented by the same reference numerals, and overlapping description will be omitted.

Figure 6:
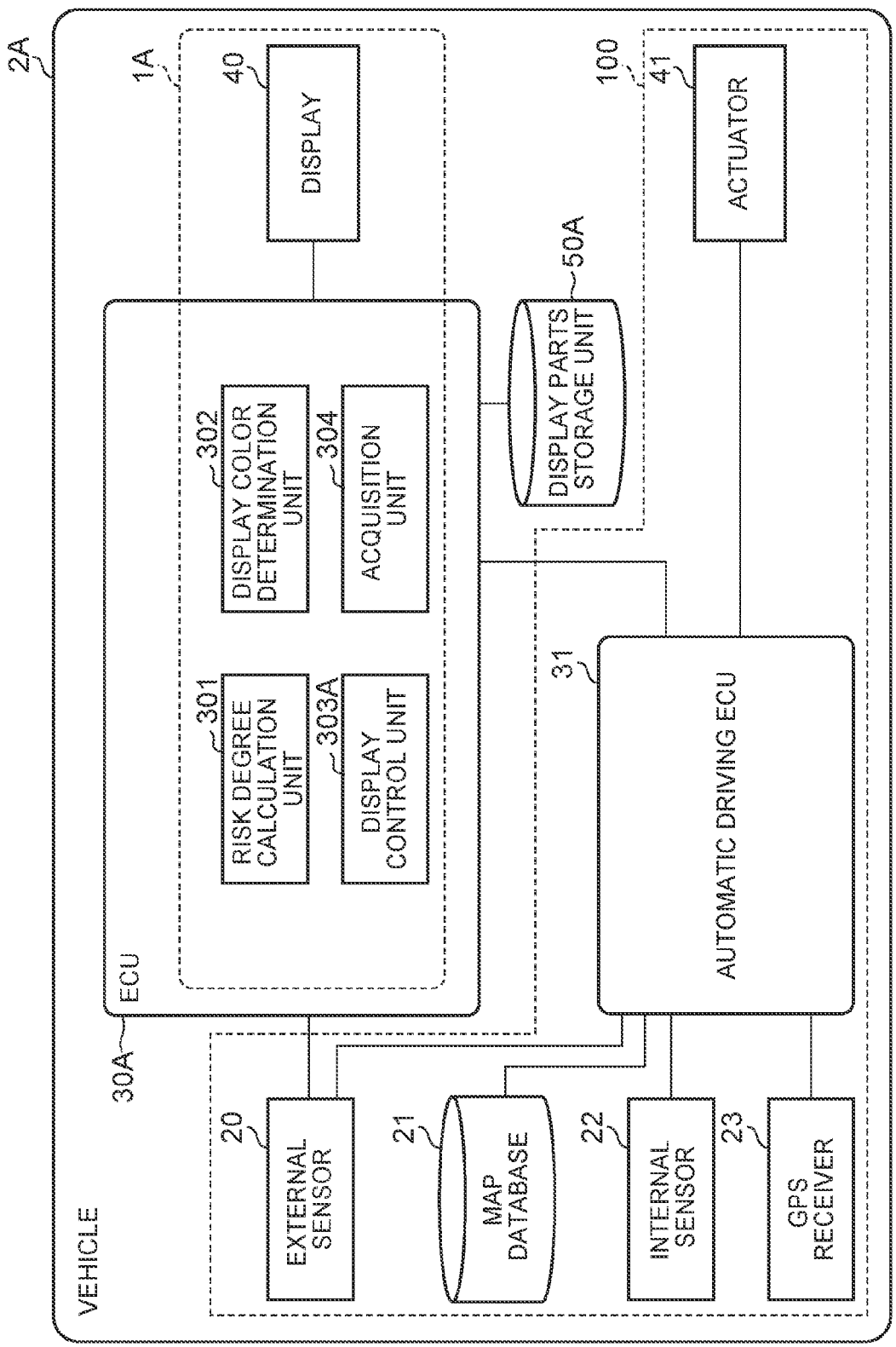
FIG. 6 is a block diagram illustrating the configuration of a vehicle including an information display device according to a second embodiment.

First, the configuration of the information display device 1A will be described. FIG. 6 is a block diagram illustrating the configuration of the vehicle 2A including the information display device 1A. As shown in FIG. 6, the vehicle 2A is different from the vehicle 2 according to the first embodiment in that an automatic driving system 100 which performs automatic driving control of the vehicle 2A is provided and an ECU 30A includes an acquisition unit 304. In addition, the number of types of display parts stored in a display parts storage unit 50A increases in contrast to the display parts storage unit 50.

The automatic driving system 100 includes an external sensor 20, a map database 21, an internal sensor 22, a global positioning system (GPS) receiver 23, an automatic driving ECU 31, and an actuator 41.

The map database 21 is a database including map information. The map database 21 is stored in a storage unit mounted in the vehicle 2A. The map information includes positional information of roads, information (classifications of curves and straight portions, curvatures of curves, and the like) of road shapes, positional information of intersections and branch points, positional information of buildings, and the like.

The internal sensor 22 is a detector which detects the traveling state of the vehicle 2A. The internal sensor 22 includes a vehicle speed sensor, an acceleration sensor, and a yaw rate sensor. The vehicle speed sensor is a detector which detects the speed of the vehicle 2A. As an example of the vehicle speed sensor, a wheel speed sensor which is provided in the wheels of the vehicle 2A, a drive shaft rotating integrally with the wheels, or the like, and detects the rotation speed of the wheels. The vehicle speed sensor transmits the detected vehicle speed information of the vehicle 2A to the automatic driving ECU 31. The acceleration sensor is a detector which detects the acceleration of the vehicle 2A. The acceleration sensor includes a front-rear acceleration sensor which detects the acceleration of the vehicle 2A in the front-rear direction, and a lateral acceleration sensor which detects the lateral acceleration of the vehicle 2A. The acceleration sensor transmits the detected acceleration information of the vehicle 2A to the automatic driving ECU 31. The yaw rate sensor is a detector which detects the yaw rate (rotational angular velocity) of the center of gravity of the vehicle 2A around the vertical axis. As an example of the yaw rate sensor, a gyro sensor is used. The yaw rate sensor transmits the detected yaw rate information of the vehicle 2A to the automatic driving ECU 31.

The GPS receiver 23 measures the position of the vehicle 2A by receiving signals from three or more GPS satellites. A specific example of the position is the latitude and the longitude. The GPS receiver 23 transmits the measured positional information of the vehicle 2A to the automatic driving ECU 31.

The actuator 41 is a device which executes traveling control of the vehicle 2A. The actuator 41 includes an engine actuator, a brake actuator, and a steering actuator.

The engine actuator controls the drive force of the vehicle by changing the amount of air supplied to the engine in response to a control signal from the automatic driving ECU 31. As a specific example, the engine actuator controls the drive force of the vehicle by changing a throttle opening. In a case where the vehicle 2A is a hybrid vehicle or an electric vehicle, the engine actuator controls a drive force of a motor as a power source. The brake actuator controls a brake system in response to a control signal from the automatic driving ECU 31 and controls a braking force applied to the wheels of the vehicle 2A. As the brake system, a hydraulic brake system can be used. The steering actuator controls the driving of an assist motor controlling steering torque in an electric power steering system in response to a control signal from the automatic driving ECU 31. With this, the steering actuator controls the steering torque of the vehicle 2A.

The automatic driving ECU 31 is an electronic control unit having a CPU, a ROM, a RAM, a CAN communication circuit, and the like. The automatic driving ECU 31 controls hardware based on a signal output from the CPU and realizes the functions of the automatic driving ECU 31 described below. As an example of a specific operation, the automatic driving ECU 31 inputs and outputs data by operating the CAN communication circuit, stores input data in the RAM, loads a program stored in the ROM on the RAM, and executes the program loaded on the RAM.

The automatic driving ECU 31 is configured to refer to the map database 21. The automatic driving ECU 31 is connected to the external sensor 20, the internal sensor 22, and the GPS receiver 23, and acquires information. The automatic driving ECU 31 is connected to the actuator 41 and controls the actuator 41 to perform automatic driving control of the vehicle 2A. The automatic driving control refers to control for allowing the vehicle 2A to automatically travel along a road on which the vehicle 2A travels. The automatic driving control includes automatic steering and automatic speed adjustment. The automatic steering is control for automatically performing the steering of the vehicle 2A. The automatic speed adjustment is control for automatically adjusting the speed of the vehicle 2A. As described below, the automatic driving ECU 31 performs the automatic driving control by planning the behavior of the vehicle 2A. In a case where the behavior plan of the vehicle 2A includes lane change or right/left turn, the automatic driving ECU 31 outputs traveling direction information to the ECU 30A. The traveling direction information is information indicating the traveling direction of the vehicle 2A. As a specific example, the traveling direction information is information indicating the lane change direction or the right/left turn direction of the vehicle 2A. The traveling direction information can be generated based on the behavior plan.

The ECU 30A includes an acquisition unit 304. The acquisition unit 304 acquires traveling direction information indicating the lane change direction or the right/left turn direction of the vehicle 2A under the automatic driving control from the automatic driving system 100 which performs the automatic driving control of the vehicle 2A. The acquisition unit 304 outputs the acquired information to a display control unit 303A.

The display control unit 303A determines a display region corresponding to the lane change direction or the right/left turn direction of the vehicle 2A between the left display region R7 and the right display region R3 based on the traveling direction information acquired by the acquisition unit 304. In a case where the traveling direction information is lane change to the right or right turn, the display control unit 303A determines that the corresponding display region is the right display region R3. In a case where the traveling direction information is lane change to the left or left turn, the display control unit 303A determines that the corresponding display region is the left display region R7. The display control unit 303A displays the direction object A5 (see FIGS. 8 and 9) in the determined display region. The direction object A5 is an object indicating the traveling direction of the vehicle 2A. As a specific example, a direction object is an object representing the lane change direction or the right/left turn direction of the vehicle 2A. The direction object A5 is a character, a symbol, a figure, or a combination thereof.

The display control unit 303A determines whether the behavior included in the plan is lane change or right/left turn based on the traveling direction information acquired by the acquisition unit 304. In a case where the behavior included in the plan is lane change, the display control unit 303A displays a text object A6 indicating that lane change is performed. In a case where the behavior included in the plan is right/left turn, the display control unit 303A displays a text object indicating that right/left turn is performed. A text object is an object of displaying text.

Figure 7:
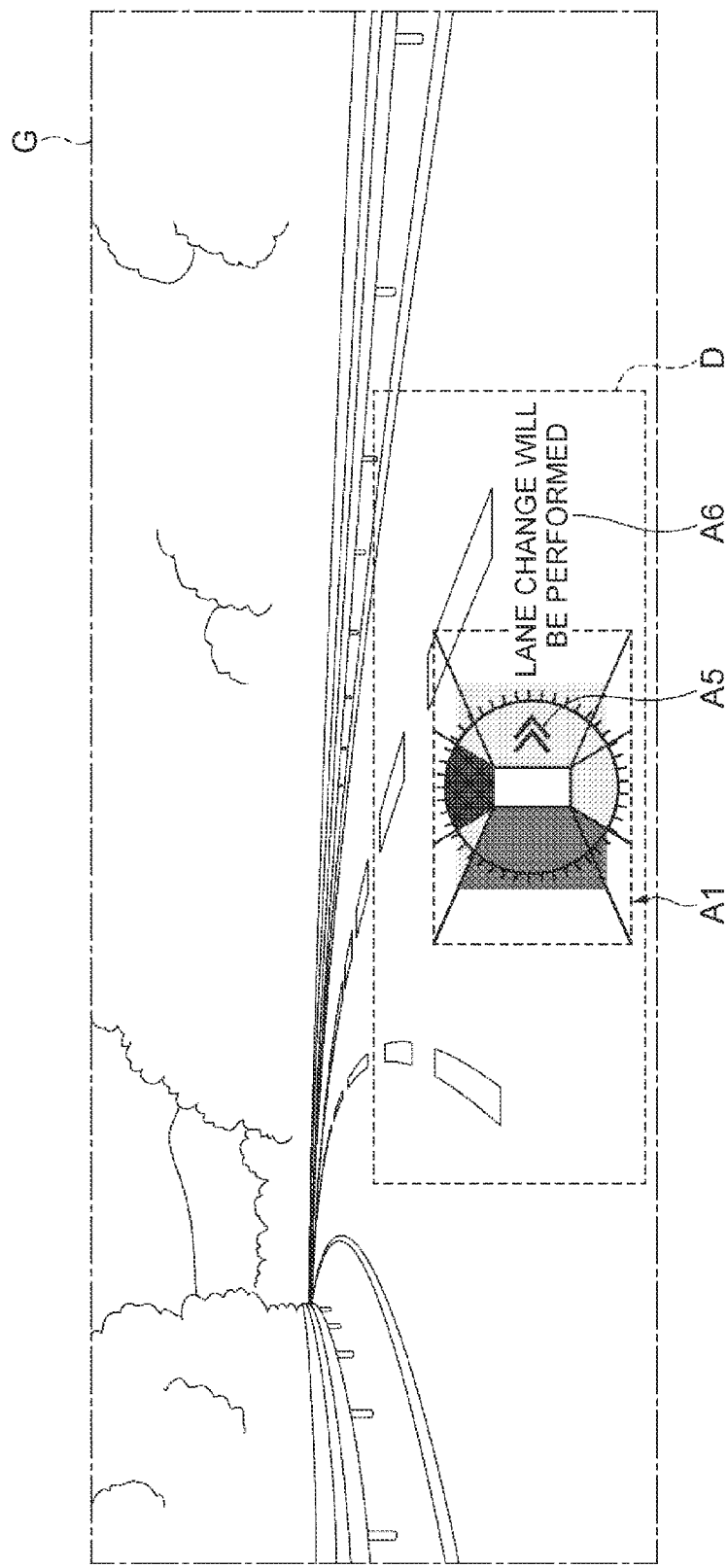
FIG. 7 shows an example of objects displayed on the information display device shown in FIG. 6.

Hereinafter, a case of lane change to the right will be described as an example. FIG. 7 shows an example of objects displayed on the information display device 1A. In FIG. 7, a part of a front windshield G is shown. In the front windshield G, a display region D of a head-up display is set. In the display region D, a circumstances notification object A1 and a text object A6 are displayed. A direction object A5 is displayed so as to overlap the circumstances notification object A1. A part of the text object A6 is displayed so as to overlap the circumstances notification object A1. The driver can visually recognize the circumstances notification object A1, the direction object A5, and the text object A6 displayed in the display region D of the front windshield G along with an actual scene.

Figure 8:
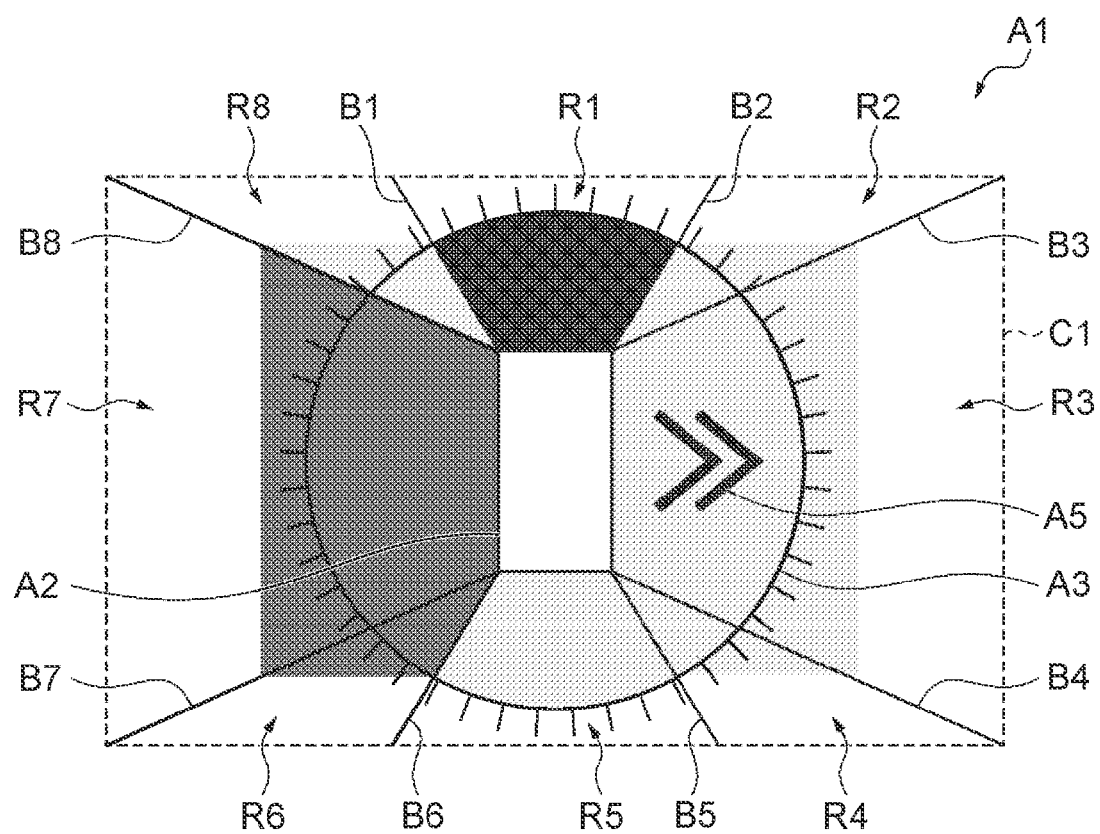
FIG. 8 is a diagram illustrating the objects shown in FIG. 7.

FIG. 8 is a diagram illustrating the objects shown in FIG. 7. The circumstances notification object A1 is the same as the circumstances notification object A1 shown in FIG. 3. In the drawing, the direction object A5 is displayed in a right display region R3. The direction object A5 is displayed as an arrow figure in a right direction. The driver can intuitively understand the vehicle 2A traveling to the right through the direction object A5. The driver can confirm the text object A6 and can clearly understand the vehicle 2A traveling to the right.

The display parts storage unit 50A stores not only the parts of the image stored in the display parts storage unit 50 but also the direction object A5 and the text object A6. Other configurations of the information display device 1A according to the second embodiment are the same as those in the information display device 1 according to the first embodiment.

Figure 9:
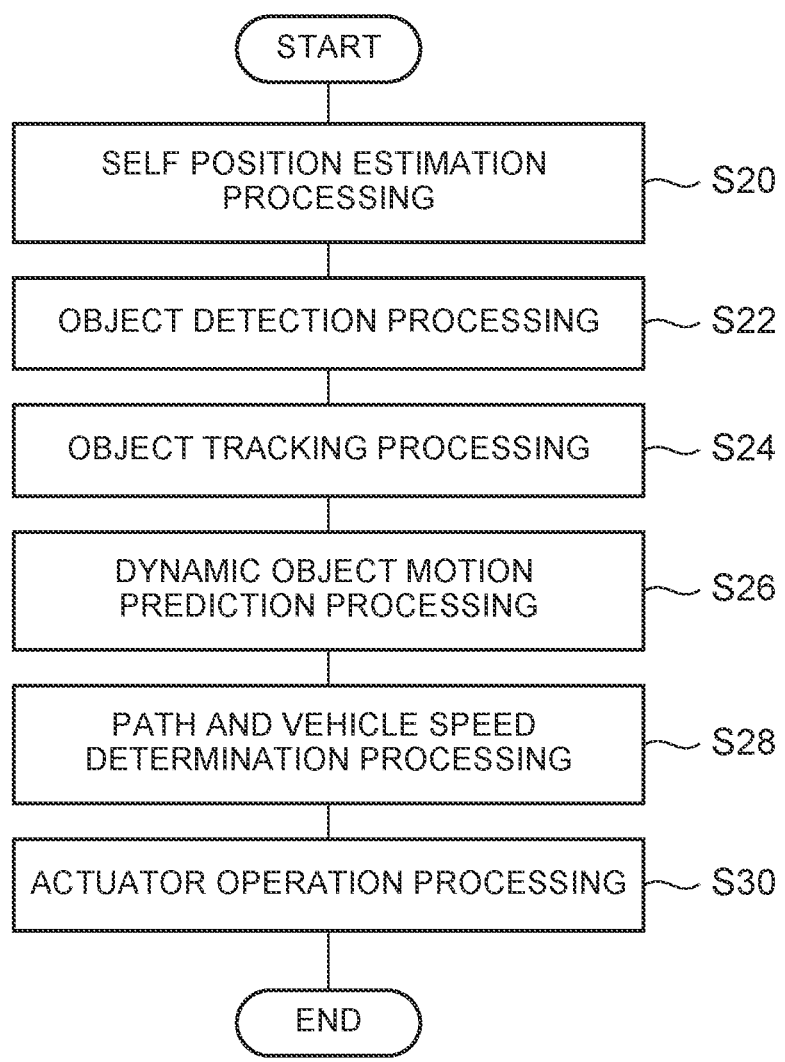
FIG. 9 is a flowchart of automatic driving control of an automatic driving ECU shown in FIG. 6.

Next, the automatic driving control of the automatic driving ECU 31 will be described. FIG. 9 is a flowchart of the automatic driving control of the automatic driving ECU 31. The flowchart shown in FIG. 9 is started in a case where a driver's instruction to start automatic driving is received.

First, the automatic driving ECU 31 recognizes the position of the vehicle 2A on the map based on the positional information of the vehicle 2A measured by the GPS receiver 23 and the map information of the map database 21 as self position estimation processing (S20). The automatic driving ECU 31 recognizes the presence of a branch point or a merging point in the path of the vehicle 2A by recognizing the position of the vehicle 2A on the map.

The automatic driving ECU 31 detects the presence or absence of an object (including a preceding vehicle) around the vehicle 2A, the size of the object, the relative speed and the relative speed between the object and the vehicle 2A, and the direction of the object based on the detection results of the external sensor 20 as object detection processing (S22). The automatic driving ECU 31 recognizes the presence or absence of a space capable of changing a lane around the vehicle 2A based on the detection results of the external sensor 20.

The automatic driving ECU 31 tracks the object detected in the object detection processing (S22) as object tracking processing (S24). The automatic driving ECU 31 performs the object detection processing (S22) successively and determines whether or not the object is a dynamic object based on the detection results of the external sensor 20 obtained in a time series. The automatic driving ECU 31 tracks the objects based on the detection results of the external sensor 20 obtained in a time series.

In a case where it is determined in the object tracking processing (S24) that the object is a dynamic object, the automatic driving ECU 31 predicts the behavior of the dynamic object based on the detection results of the external sensor 20 obtained in a time series as dynamic object motion prediction processing (S26). The automatic driving ECU 31 predicts that the dynamic object does not move to a space where lane change is possible, the dynamic object reduces speed, and the like using the detection results of the external sensor 20 obtained in a time series.

The automatic driving ECU 31 plans the behavior of the vehicle 2A based on the behavior of the dynamic objected predicted by the dynamic object motion prediction processing (S26) as path and vehicle speed determination processing (S28). As a specific example, the automatic driving ECU 31 determines the path and the target speed of the vehicle 2A. The path is a target traveling trajectory of the vehicle 2A. In a case where it is predicted in the dynamic object motion prediction processing (S26) that the dynamic object does not move to a space where lane change is possible and the dynamic object reduces speed, the automatic driving ECU 31 generates a path for changing a lane to the space.

In a case where the path is generated, the automatic driving ECU 31 outputs the traveling direction information to the ECU 30A. With this, the ECU 30A selects the direction object A5 and the text object A6 based on the traveling direction information with reference to the display parts storage unit 50A. In addition, the ECU 30A determines a display region for displaying the direction object A5 based on the traveling direction information. With this, the direction object A5 and the text object A6 can be displayed in the display region D.

The automatic driving ECU 31 operates the actuator 41 so as to realize the path determined in the path and vehicle speed determination processing (S28) as actuator operation processing (S30). In a case where the actuator operation processing (S30) ends, the automatic driving ECU 31 ends control processing shown in FIG. 9. In a case where a driver's operation to end automatic driving is not received, the automatic driving ECU 31 restarts the processing from the start. In a case where the driver's operation to end automatic driving is received, the automatic driving ECU 31 does not restart the processing from the start.

As described above, since the information display device 1A according to the second embodiment can give notification of risk and the traveling direction of the vehicle 2A using the same display region (in the example of FIGS. 7 and 8, the right display region R3), it is possible to effectively utilize the display region D of the display 40.

The disclosure may be subjected to various modifications and improvements to the above-described embodiments based on common knowledge of those skilled in the art. The following modification example of the above-described embodiments may be made using the technical matters described in the above-described embodiments. The configurations of the respective embodiments may be used in appropriate combinations.

Modification Examples of Display or Display Processing

FIG. 10A to FIG. 10C are diagrams illustrating modification examples of the direction object A5 of the second embodiment. As shown in FIG. 10A, the direction object A5 may be an arrow figure. As shown in FIG. 10B, the direction object A5 may be a character "R". As shown in FIG. 10C, the direction object A5 may be an object having a character and a figure.

Figure 11:
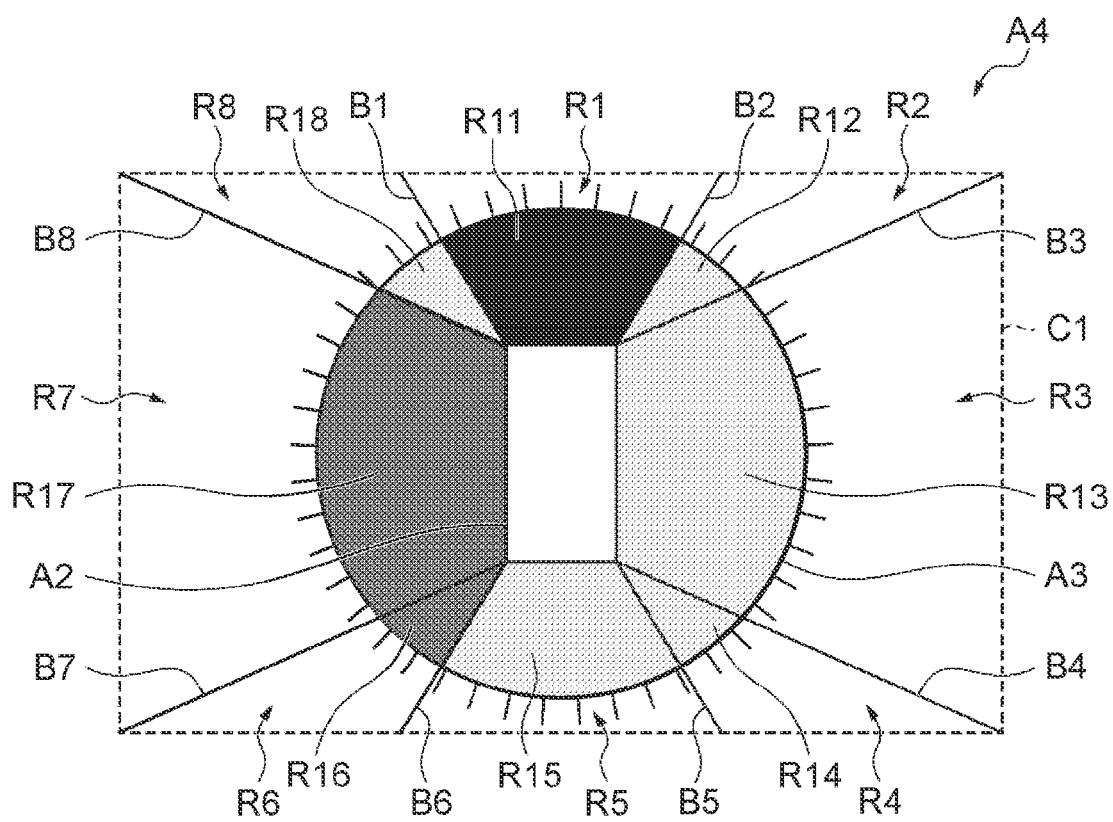
FIG. 11 is a diagram illustrating a modification example of objects.

FIG. 11 is a diagram illustrating a modification example of the circumstances notification object A1. A circumstances notification object A4 of the modification example is different from the circumstances notification object A1 of the first embodiment in that a region where color display is performed is limited to the inside of the circle object A3. In the circumstances notification object A4, the display colors of a display region R11 in a front display region R1, a display region R15 in a rear display region R5, a display region R17 in a left display region R7, a display region R13 in a right display region R3, a display region R18 in an upper left display region R8, a display region R12 in an upper right display region R2, a display region R16 in a lower left display region R6, and a display region R14 in a lower right display region R4 correspond to the risk degrees. Even in a case where the circumstances notification object A4 of the modification example is used, the information display device 1 can effectively utilize the display region D of the display 40. The circumstances notification object A4 of the modification example and the direction object A5 or the text object A6 of the second embodiment may be combined.

In the above-described embodiments, the circumstances notification object A1 may not include the circle object A3. That is, the circumstances notification object A1 may be formed of the vehicle object A2 and the radiation objects B1 to B8. The radiation objects B1 to B8 may be provided so as to correspond to the detection ranges of the sensors, or may be dynamically changed in position according to the detection ranges of the sensors.

In the above-described embodiments or modification example, the vehicle object A2 is not limited to a rectangular shape, and may have any shape which expresses the vehicle 2 in plan view. As a specific example, the vehicle object A2 may have a square shape, an elliptical shape, or a circular shape, or may be an object which expresses the appearance shape of the vehicle 2 in plan view.

In the above-described embodiments or modification example, the virtual quadrangle C1 may be divided into at least four divisions of the front, rear, right, and left of the vehicle 2. The display control unit 303 may control color display of at least four divisions of the front, rear, right, and left of the vehicle 2. The display control unit 303 may control color display of only four divisions of the front, rear, right, and left of the vehicle 2 even if the virtual quadrangle C1 is divided into eight divisions or six divisions.

In the above-described embodiments or modification example, the display color determination unit 302 may determine the display colors without using the color table. As such an example, a case where the display color determination unit 302 determines the display colors using a conversion expression between the risk degree and a pixel value is considered.

In the above-described embodiments or modification example, the display control unit 303 or 303A may change the display color of each display region simultaneously. In this way, the change timing of the display is arranged, whereby it is possible to give understandable notification to the driver.

In the above-described second embodiment, the display control unit 303A may not display the text object A6. In the above-described second embodiment, the direction object A5 may be displayed in the front display region R1, the rear display region R5, the upper left display region R8, the upper right display region R2, the lower left display region R6, or the lower right display region R4, as well as the left display region R7 and the right display region R3.

A calculation method of the risk degree of the risk degree calculation unit 301 is not limited to the method described in the above-described embodiments. For example, the surroundings of the vehicle may be divided into a plurality of regions, overlapping between a detected object and a region may be calculated as a coverage, and the risk degree may be calculated greater when the coverage is greater.

Modification Examples of Configuration

In the above-described embodiments, the external sensor 20 is not limited to a lidar which outputs laser light. The external sensor 20 may be a camera sensor or a radar which outputs electric waves. The vehicle 2 may include a radar, a camera sensor, and a lidar redundantly as the external sensor 20.

The camera sensor has an image element which captures the outside circumstances of the vehicle 2, and an arithmetic unit which performs object recognition based on an image. The image element is provided on the rear side of a front glass of the vehicle 2, and captures the outside circumstances in front of or behind the vehicle 2. The arithmetic unit recognizes the position and the size of the object based on the feature quantity of pixels, and recognizes the relative distance and the relative speed between the object and the vehicle 2 based on the feature quantity between images continuously captured. The radar detects an obstacle outside the vehicle 2 using electric waves, such as millimeter waves. The radar measures the relative distance and the relative speed between the object and the vehicle 2 by transmitting millimeter waves to the surroundings of the vehicle 2 and receiving reflected waves reflected from the obstacle.

As in the above-described embodiments, even in a case where a camera sensor or a radar is used as the external sensor 20, the risk degree calculation unit 301 can calculate the risk degree. Similarly, the display control unit 303 can change the display color of the circumstances notification object A1 according to the risk degree. With this, the display region of the display 40 is effectively utilized. Furthermore, the attachment position of the external sensor 20 is not limited to that in the above-described embodiments, and the external sensor 20 may be attached so as to be buried in a section in a roof side rail. In addition, it is not necessary to provide a plurality of lidars as in the above-described embodiments, and a single lidar which performs monitoring in all directions (360 degrees around the vehicle) may be provided on the roof.

In the above-described embodiments, the display 40 is not limited to the head-up display. The display 40 may be a liquid crystal display provided in an instrument panel or a liquid crystal display of a navigation system. As in the above-described embodiments, even in a case where a liquid crystal display is used as the display 40, the display control unit 303 can change the display color of the circumstances notification object according to the risk degree. With this, the display region of the display 40 is effectively utilized.

In the second embodiment described above, the map database 21 may be stored in a computer of a facility, such as an information processing center communicable with the vehicle.

In the above-described embodiments, in a case where the vehicle includes a regenerative brake system, the brake actuator may control both of the hydraulic brake system and the regenerative brake system.

In the above-described embodiments, the ECUs 30, 30A and the automatic driving ECU 31 may be constituted of a plurality of electronic control units.

In the second embodiment described above, the automatic driving ECU 31 may output the traveling direction information to the ECU 30A N seconds (where N is an integer) before lane change.

In the above-described embodiments, the color table can use various colors, as well as blue, yellow, and red.

What is claimed is:

1. An information display device which displays an image on an on-vehicle display mounted in a vehicle, the vehicle including a detector detecting an object around the vehicle, the information display device comprising:
   the on-vehicle display configured to display a vehicle object corresponding to the vehicle in plan view, a front display region of the vehicle object corresponding to a region in front of the vehicle, a rear display region of the vehicle object corresponding to a region behind the vehicle, a left display region of the vehicle object corresponding to a region left to the vehicle, a right display region of the vehicle object corresponding to a region right to the vehicle, and a circular circle object surrounding the vehicle object and being disposed to cross the front display region, the rear display region, the left display region, and the right display region; and
   at least one electronic control unit programmed to:
   display the vehicle object, the front display region, the rear display region, the left display region, the right display region, and the circle object on the on-vehicle display,
   calculate a risk degree indicating the risk of an object around the vehicle and the vehicle approaching each other based on a detection result of the detector for each of the front display region, the rear display region, the left display region, and the right display region,
   determine display colors of the front display region, the rear display region, the left display region, and the right display region based on the risk degree,
   display the front display region, the rear display region, the left display region, and the right display region in the display colors at least inside of the circle object,
   acquire traveling direction information indicating a lane change direction or a right or left turn direction of the vehicle during automatic driving control from an automatic driving system performing automatic driving control on the vehicle; and
   display a direction object, representing the lane change direction or the right or left turn direction of the vehicle, in the left display region or the right display region inside of the circle object that corresponds to the lane change direction or the right or left turn direction of the vehicle, based on the traveling direction information acquired from the automatic driving system, wherein a center of the vehicle object is positioned at a center of the inside of the circle object, wherein graduations are marked on the circle object at regular intervals.

2. The information display device according to claim 1, wherein the on-vehicle display is configured to display a radiation object which extends outward from the vehicle object and divides the circle object into the front display region, the rear display region, the left display region, and the right display region.

3. The information display device according to claim 2, wherein the radiation object has one end disposed outside the circle object and the other end disposed inside the circle object.

4. The information display device according to claim 1, wherein the display color is a same color in a same display region.

5. The information display device according to claim 1, wherein the display color is determined such that a case where the risk degree is the smallest is associated with blue and a case where the risk degree is the greatest is associated with red.

6. The information display device according to claim 1, wherein the at least one electronic control unit is further programmed to:
output a signal for controlling traveling of the vehicle based on the traveling direction information, and
control the traveling of the vehicle by sending the signal to an actuator of the vehicle.

7. The information display device according to claim 1, wherein the on-vehicle display is a head-up display or a liquid crystal display.

8. The information display device according to claim 1, wherein the detector is a laser imaging detection and ranging, a radar, or a camera sensor.

9. The information display device according to claim 1, wherein each of the left display region and the right display region is larger than the front display region.

10. The information display device according to claim 1, wherein the direction object overlaps with the display color in the left display region or the right display region.

* * * * *